United States Patent
Hamilton

(10) Patent No.: US 7,252,066 B2
(45) Date of Patent: Aug. 7, 2007

(54) INTEGRATED DRIVE SPROCKET AND GEAR FOR BALANCE SHAFT

(75) Inventor: Jeffrey R. Hamilton, Davisburg, MI (US)

(73) Assignee: Cloyes Gear and Products, Inc., Fort Smith, AR (US)

( * ) Notice: Subject to any disclaimer, the term of this patent is extended or adjusted under 35 U.S.C. 154(b) by 0 days.

(21) Appl. No.: 11/337,886

(22) Filed: Jan. 23, 2006

(65) Prior Publication Data

US 2006/0225687 A1   Oct. 12, 2006

Related U.S. Application Data

(62) Division of application No. 10/420,380, filed on Apr. 22, 2003, now Pat. No. 6,988,479.

(60) Provisional application No. 60/374,645, filed on Apr. 23, 2002.

(51) Int. Cl.
*F02B 75/06* (2006.01)
*B21K 3/00* (2006.01)
*B23P 15/14* (2006.01)

(52) U.S. Cl. .............................. 123/192.2; 29/888.01; 29/893

(58) Field of Classification Search ............. 123/192.2; 29/893, 893.3, 893.35, 888.01
See application file for complete search history.

(56) References Cited

U.S. PATENT DOCUMENTS

| 4,000,666 A | 1/1977 | Ito et al. |
| 4,894,501 A | 1/1990 | Pfaffmann et al. |
| 5,228,814 A | 7/1993 | Suwijn |
| 5,535,643 A | 7/1996 | Garza |
| 5,715,784 A | 2/1998 | Okui et al. |
| 5,893,346 A | 4/1999 | Hosoya |
| 6,192,851 B1 | 2/2001 | Asahara et al. |
| 6,205,970 B1 | 3/2001 | Iwata et al. |
| 6,305,339 B1 | 10/2001 | Iwata et al. |
| 6,432,017 B1 | 8/2002 | Shimomura |
| 6,708,652 B2 | 3/2004 | Oki |

FOREIGN PATENT DOCUMENTS

JP       76005826 B     2/1976

*Primary Examiner*—Noah P. Kamen
(74) *Attorney, Agent, or Firm*—Fayysharpe LLP

(57) ABSTRACT

An idler shaft assembly for an internal combustion engine provides significant cost savings eliminates processing and assembly steps, and provides accurate orientation of components. The idler shaft assembly includes a shaft adapted for rotation about a first axis. A one-piece sprocket and gear assembly is received on the shaft. A sprocket portion of the one-piece assembly has a first diameter that cooperates with an associated drive chain that is driven by the crankshaft, and a gear portion of the one-piece assembly has a second diameter that cooperates with an associated gear of an associated balance shaft.

8 Claims, 2 Drawing Sheets

MULTI PART DESIGN (CURRENT)

ONE PIECE DESIGN

INTEGRATED DRIVE SPROCKET AND GEAR FOR BALANCE SHAFT

CROSS-REFERENCE TO RELATED APPLICATIONS

This application is a divisional of U.S. application Ser. No. 10/420,380 filed Apr. 22, 2003, now U.S. Pat. No. 6,988,479 which claims priohty from and benefit of the filing date of U.S. provisional application Ser. No. 60/374,645 filed Apr. 23, 2002, and the disclosures of both of these prior applications are hereby expressly incorporated by reference herein.

BACKGROUND OF INVENTION

This application relates to engine balancing for internal combustion engines, and more particularly to an integrated sprocket and gear assembly for such an arrangement.

It is well known to employ balance shafts in internal combustion engines to generate forces that balance or smooth the running operation of the engine. U.S. Pat. Nos. 5,535,643; 5,715,784; 5,893,346; 6,205,970; and 6,305,339 are representative of conventional sprocket and gear assemblies associated with balance shafts of an internal combustion engine and the details of each are incorporated herein by reference. More particularly, a balance shaft includes eccentric masses that rotate in conjunction with the crankshaft to reduce the vibrations associated with the pistons. Usually, a pair of balance shafts is provided and one of the balance shafts is driven by the crankshaft so the balance shafts rotate at a desired ratio relative to the crankshaft. A drive sprocket is located on the crankshaft and receives the drive chain. Within the closed loop path of the drive chain is a driven sprocket, for example, on one end of a first balance shaft. It is necessary to coordinate the rotation of the first and second (right-hand and left-hand) balance shafts. This is often accomplished via intermeshing gears so that the balance shafts rotate in unison. Alternately, an idler shaft includes a sprocket driven by the chain and a separate gear for driving a gear associated with the other, or second balance shaft. In this manner, even though the balance shafts are spaced on opposite sides of the crankshaft, they are simultaneously driven in opposite directions for balance purposes.

SUMMARY OF THE INVENTION

The present invention provides an apparatus and method of forming an idler shaft assembly that eliminates components and processing/assembly steps relative to conventional arrangements with resultant cost savings.

An idler shaft assembly operatively associated with a crankshaft of an internal combustion engine includes a shaft adapted for rotation about a first axis and a one-piece sprocket and gear assembly received on the shaft. A sprocket portion of the one-piece assembly has a first diameter that cooperates with an associated drive chain that is driven by the crankshaft, and a gear portion of the one-piece assembly has a second diameter that cooperates with a gear of an associated balance shaft.

A method of forming an idler shaft assembly for an internal combustion engine having a crankshaft and a balance shaft includes the steps of providing a shaft having a first axis, forming a sprocket portion on the shaft, and forming a gear portion on the shaft having a second diameter that cooperates with an associated gear of the associated balance shaft.

The idler shaft assembly with integrated sprocket portion and gear portion is heat treated in its entirety.

Subsequently, the sprocket portion of the assembly is additionally heat treated.

DETAILED DESCRIPTION OF THE INVENTION

Figures 1A, 1B:
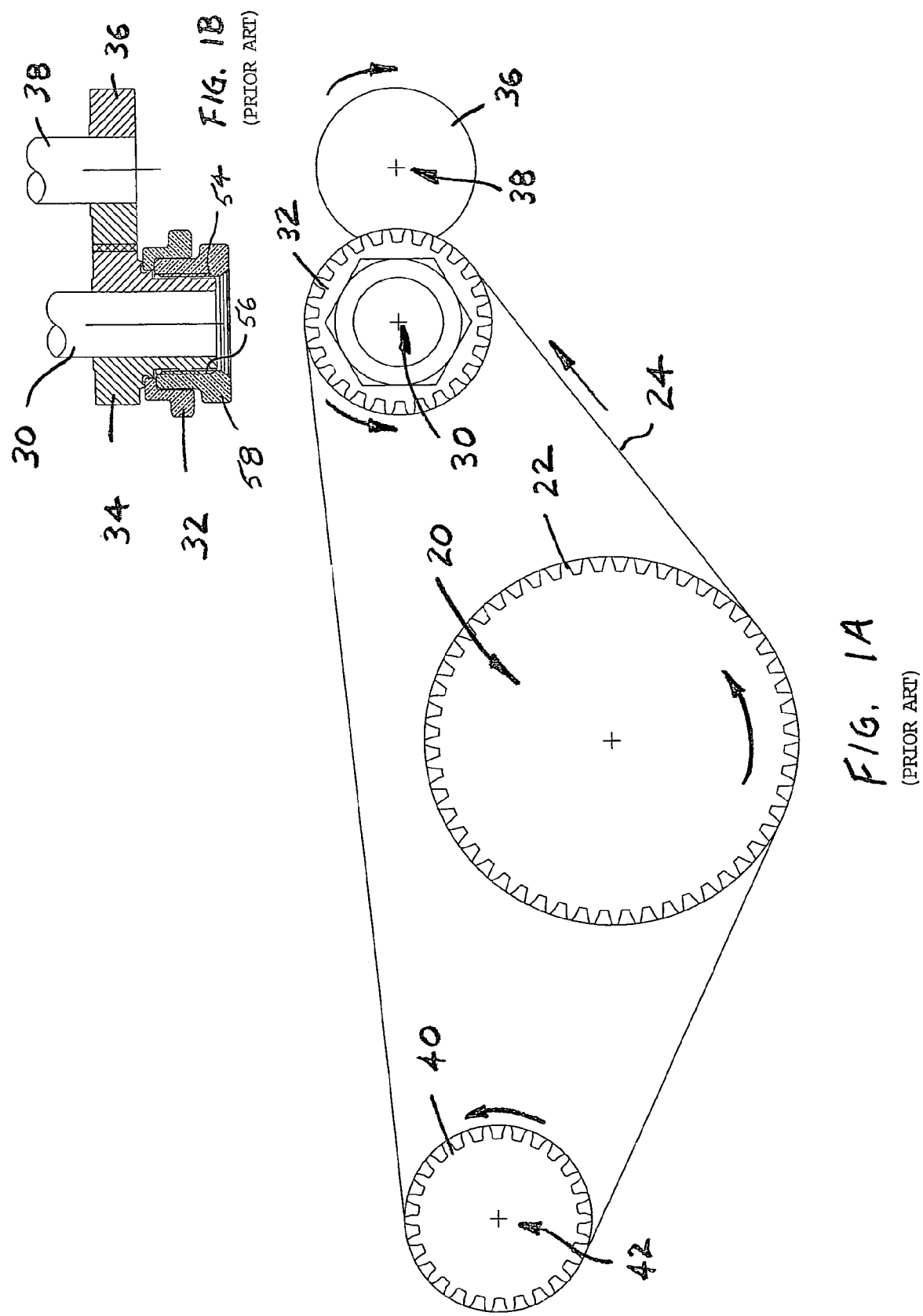
FIG. 1A is an elevational view of a conventional crankshaft that drives an engine drive chain in operative engagement with first and second balance shafts, and an idler shaft assembly.
FIG. 1B is a sectional view of the idler shaft assembly and its cooperation with driven gear of a balance shaft.

An example of this latter type of arrangement is illustrated in FIGS. 1A and 1B. A crankshaft 20 includes a drive sprocket 22 located at one end. As shown, the drive sprocket 22 is adapted for rotation in a counter-clockwise direction. The teeth of the drive sprocket engage drive chain 24 that also rotates in a counter-clockwise direction. As the chain traverses this generally counter-clockwise path, the chain is engaged by a conventional tensioner assembly (not shown). The tensioner assembly eliminates any slack, for example, through use of a biased shoe adapted to engage the chain and provide a desired level of tension thereto. The chain passes around an idler shaft 30 which has mounted thereon a driven sprocket 32. Also disposed on the idler shaft 30 is a second gear 34 (best seen in FIG. 1B) that likewise rotates in a counter-clockwise direction. The second gear acts as a drive gear to driven gear 36 associated with a first or right-hand balance shaft 38. The driven gear 36 rotates in a clockwise direction through its engagement with the second gear of the idler shaft.

The chain next proceeds about a driven sprocket 40 associated with a second or left-hand balance shaft 42 before proceeding about the drive gear 22 to define the closed loop. It will be appreciated that the right-hand and left-hand balance shafts 38, 42 rotate in opposite directions in this arrangement.

Figure 2:
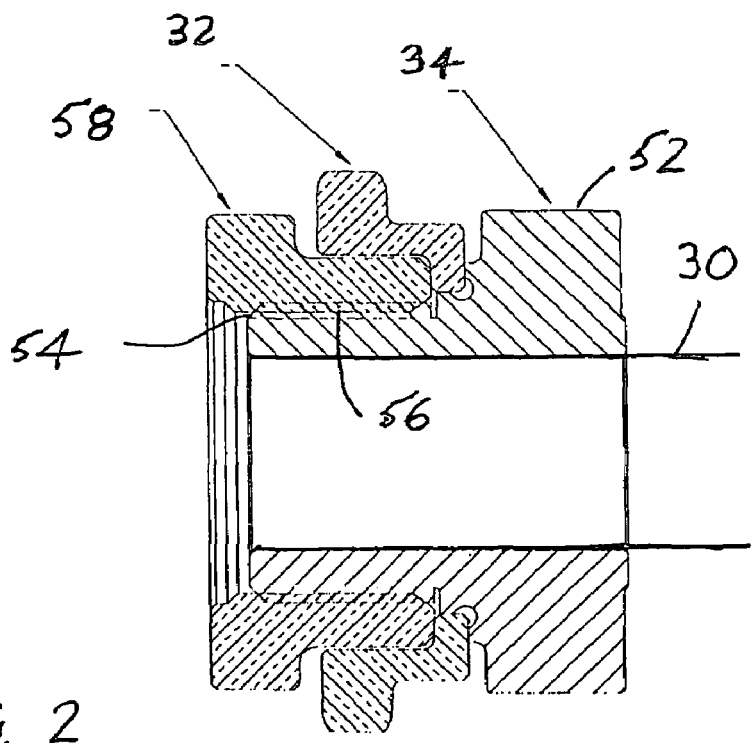
FIG. 2 is an enlarged cross-sectional view of a conventional idler shaft assembly.

FIG. 2 is an enlarged view of a portion of the idler shaft assembly, namely the sprocket 32 and a drive gear 34. The drive gear 34 has gear teeth 52 disposed along a perimeter thereof in conventional fashion. As shown, the gear teeth 52 are disposed at a first end (or right-hand end as shown in FIG. 2) of the gear. A second end, or left-hand end, of the gear is externally threaded as represented by reference numeral 54. The external threads cooperate with internal threads 56 associated with a fastener 58. Thus, the driven sprocket 32 is held in driving engagement between the drive gear 34 and the nut 58 in a manner generally well known in the art. The original assembly method for the invention requires that the gear and the sprocket be formed as separate components and then separately assembled to the engine at the engine plant. Thus, as will be appreciated from a review of FIG. 2, three separate components are received over the idler shaft 30; namely, drive gear 34, driven sprocket 32, and fastener 58.

According to the present invention, a one-piece design is proposed for receipt on the idler shaft. A suitable material used to form the driven gear in the conventional arrangement of FIG. 2 is preferably used for the entire component in FIG. 3. To form the various diameter portions of the design, the blank material is turned, as is conventionally done. It will be appreciated, however, that first and second lands 60, 62 are formed on the shaft, and the land 62 separates an integral driven sprocket 70, and its associated sprocket teeth 72, from drive gear 80, and its associated drive teeth 82. Sprocket teeth 72 are cut with an associated tool or hob (not shown) and the gear teeth 82 are also cut in a separate manufacturing step. As is known, the gear teeth are typically cut by either shaper cutting or hobbing. In the illustrated embodiment, the teeth of the gear portion are cut by shaping the gear and the teeth of the sprocket portion are cut by hobbing the sprocket since one cannot hob the gear portion because the larger diameter of the sprocket would interfere when the gear and sprocket portions are located close together. In other instances, different teeth cutting processes could be used depending on the dimensional relationships of the components.

Figure 3:
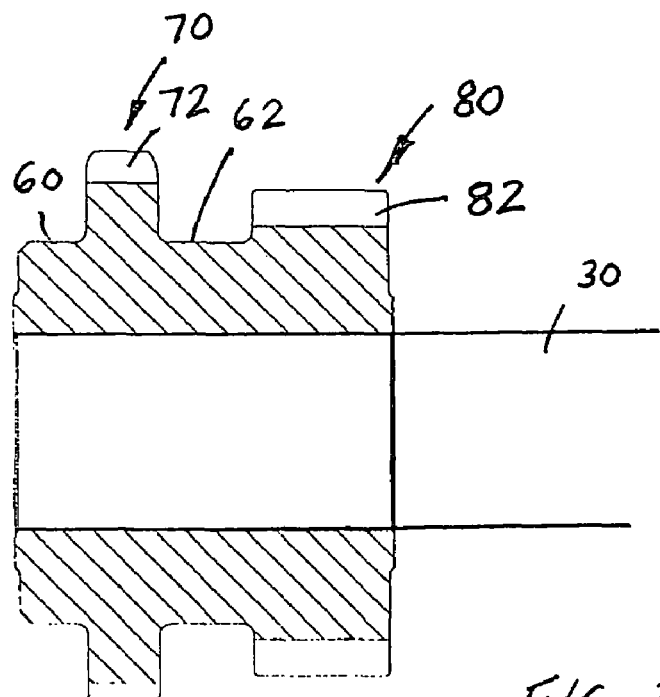
FIG. 3. is an enlarged cross-sectional view of an idler shaft assembly in accordance with the present invention.

Preferably, the entire component shown in FIG. 3 is then heat treated, for example, through a ferritic nitrocarburizing process. Further heat treatment of only the sprocket is preferably, for example, through an induction process. Subsequently, the faces and central bore of the one-piece component are ground in a conventional manner and the gear teeth then honed in a final manufacturing step. It will be appreciated that the gear portion of the idler shaft assembly can be made harder than the sprocket portion if desired. For example, the entire one-piece member can be heat treated, i.e., undergo a carburizing process, and subsequently only the gear portion induction heat treated.

Thus, a substantial reduction in manufacturing steps is still achieved with the one-piece design. The series of manufacturing steps described above is in contrast with the current process for forming the assembly of FIG. 2. According to the current process, the blank material used to form the gear 34 is turned, and the blank is prepared to receive the fastener 58 in a second manufacturing step. The gear teeth 52 are then cut in a third manufacturing step and the gear 34 sent through a conventional heat treatment process. Subsequently, the gear is machined to accept the fastener, and an orienting feature provided via a machining process step, and the faces and bore are ground in yet another step. A pilot diameter is then formed through a grinding operation to receive the sprocket. An orienting feature is provided and the gear teeth are honed to complete the conventional manufacturing process.

Thus, the present invention eliminates the components and assembly costs associated with these separate components. Although the manufacturing steps associated with the unitary design of FIG. 3 add additional steps to the gear manufacturing process, it eliminates other manufacturing steps, thus likely reducing the overall cost of the assembly as well.

In addition to the significant cost saving associated with combining the separate gear and sprocket components, associated processing steps are eliminated, and orientation of the components is immediately established during manufacture. This arrangement also eliminates concerns with inventory control, and costs associated with assembly of the separate components.

The invention has been described with reference to the preferred embodiment. Modifications and alterations will occur to others upon reading and understanding this specification. For example, various other manufacturing steps may be employed or in a different sequence. Likewise, different materials may be used or alternative heat treatment processes without departing from the present invention. It is intended to include all such modifications and alterations in so far as they come within the scope of the appended claims or the equivalents thereof.

Having thus described the invention, it is claimed:

1. In an internal combustion engine having a crankshaft and an idler shaft assembly operatively associated therewith, the idler shaft assembly including:
   a shaft adapted for rotation about a first axis;
   a one-piece integrated sprocket and gear received on the shaft, said one-piece integrated sprocket and gear comprising;
   a sprocket portion having a first diameter that cooperates with an associated drive chain that is driven by the crankshaft;
   a gear portion having a second diameter that cooperates with an associated gear of an associated balance shaft;
   wherein said one-piece integrated sprocket and near overall is heat treated by a first heat treatment process, and wherein only one of said sprocket portion and said gear portion is further heat treated by a second heat treatment process that is different than the first heat treatment process so that said sprocket portion has a different hardness relative to said gear portion.

2. The invention of claim 1 wherein the sprocket portion is located axially outward on the shaft relative to the gear portion.

3. The invention of claim 2 wherein the first diameter of the sprocket portion is larger than the second diameter of the gear portion.

4. The invention of claim 1 wherein the first diameter of the sprocket portion is larger than the second diameter of the gear portion.

5. A method of forming a one-piece integrated sprocket and gear, said method comprising:
   providing a shaft having a first axis;
   removing material from said shaft to define an integrated one-piece sprocket and gear comprising first and second reduced diameter lands, a sprocket located between said first and second lands, and a gear located adjacent said second land at a location spaced from said sprocket, wherein said sprocket and gear have dissimilar diameters;
   heat treating both said sprocket and said gear of said one-piece integrated sprocket and gear using a first heat treatment process;
   heat treating only one of said sprocket and gear of said one-piece integrated sprocket and gear by a second heat treatment process that is different than the first heat treatment process so that said sprocket has a different hardness as compared to said gear.

6. The method of claim 5 wherein the second heat treatment process comprises induction heat treating the sprocket.

7. The method of claim 6 wherein the first heat treatment process comprises carburizing.

8. The method of claim 7 wherein the first heat treatment process is performed before the second heat treatment process.

* * * * *